(12) United States Patent
Schmidt, Jr. et al.

(10) Patent No.: US 8,721,882 B2
(45) Date of Patent: May 13, 2014

(54) MAGNETIC FLUID CLEANING SYSTEM

(75) Inventors: Joseph T. Schmidt, Jr., Chx, MI (US);
Angela Schmidt, legal representative, Chx, MI (US); Ronald J. Hanna, Petoskey, MI (US)

(73) Assignee: Magnetic Systems International, Boyne City, MI (US)

( * ) Notice: Subject to any disclaimer, the term of this patent is extended or adjusted under 35 U.S.C. 154(b) by 294 days.

(21) Appl. No.: 13/027,494

(22) Filed: Feb. 15, 2011

(65) Prior Publication Data
US 2012/0006733 A1   Jan. 12, 2012

Related U.S. Application Data

(60) Provisional application No. 61/304,566, filed on Feb. 15, 2010.

(51) Int. Cl.
| | |
|---|---|
| *B03C 1/18* | (2006.01) |
| *B03C 1/16* | (2006.01) |
| *B03C 1/02* | (2006.01) |
| *B01D 35/06* | (2006.01) |

(52) U.S. Cl.
CPC ... *B03C 1/18* (2013.01); *B03C 1/16* (2013.01); *B03C 1/02* (2013.01); *B01D 35/06* (2013.01)
USPC ........... 210/222; 210/396; 210/401; 209/219; 209/229

(58) Field of Classification Search
USPC .................. 210/222, 396, 401; 209/219, 229
See application file for complete search history.

(56) References Cited

U.S. PATENT DOCUMENTS

| | | | | |
|---|---|---|---|---|
| 3,017,031 | A * | 1/1962 | Fowler | 210/222 |
| 7,638,061 | B2 | 12/2009 | Moore | |
| 2007/0187302 | A1 * | 8/2007 | Parra Huerta | 210/222 |

\* cited by examiner

*Primary Examiner* — David A Reifsnyder
(74) *Attorney, Agent, or Firm* — Gifford, Krass, Sprinkle, Anderson & Citkowski, P.C.

(57) ABSTRACT

A magnetic fluid cleaning system that includes a housing and a driven magnetic roller disposed within the housing. A belt is arranged about the magnetic roller. The belt having magnetic particles from the fluid received thereon when within a magnetic field of the magnetic roller. The belt travels about the magnetic roller out of the magnetic field and the magnetic particles remain on the belt for removal.

12 Claims, 3 Drawing Sheets

MAGNETIC FLUID CLEANING SYSTEM

RELATED APPLICATION

This application claims priority of U.S. Provisional Patent Application Ser. No. 61/304,566 filed Feb. 15, 2010, which is incorporated herein by reference.

FIELD OF THE INVENTION

The invention relates to magnetic fluid cleaning structures and systems.

BACKGROUND OF THE INVENTION

Magnetic fluid filters may be utilized in metalworking industries to remove fine ferrous or magnetic particles from oil or other fluids. Additionally, magnetic fluid filters may be used in other applications such as in the cleaning of tanks or other such industries.

Generally magnetic fluid systems include structures in which a fluid is pumped into a filter body. The fluid contacts a magnetic roller to remove the ferrous material. The cleaned fluid is then directed out of the housing into a tank. Generally the magnetic roller is positioned next to a scraper such that it may remove material captured by the magnetic roller. However, such systems are prone to problems as the scraper is prone to clogging and does not remove all the materials from the magnetic roller. In such a situation the magnetic roller may have very small ferrous particles and the surface of the roller compared to the scraper is not precise enough to remove the small particles resulting in small particles that wedge between the scraper edge and the magnetic roller that cause wear on both of the components.

There is therefore a need in the art for an improved magnetic fluid filter that solves the problems associated with the prior art and eliminates wear on components of the system. Additionally, there is a need in the art for a magnetic fluid filter system that does not require constant cleaning to avoid clogging of the system.

SUMMARY OF THE INVENTION

In one aspect there is disclosed a magnetic fluid cleaning system that includes a housing and a driven magnetic roller disposed within the housing. A belt is arranged about the magnetic roller. The belt having magnetic particles from the fluid received thereon when within a magnetic field of the magnetic roller. The belt travels about the magnetic roller out of the magnetic field and the magnetic particles remain on the belt for removal.

In another aspect there is disclosed a magnetic fluid cleaning system a housing and a driven magnetic roller disposed within the housing. A nonmagnetic roller is coupled to the housing and separated from the magnetic roller. A belt is arranged about the magnetic roller and nonmagnetic roller. The belt having magnetic particles from the fluid received thereon when within a magnetic field of the magnetic roller. The belt travels about the magnetic roller out of the magnetic field and the magnetic particles remain on the belt for removal.

DETAILED DESCRIPTION OF THE PREFERRED EMBODIMENTS

Figure 1:
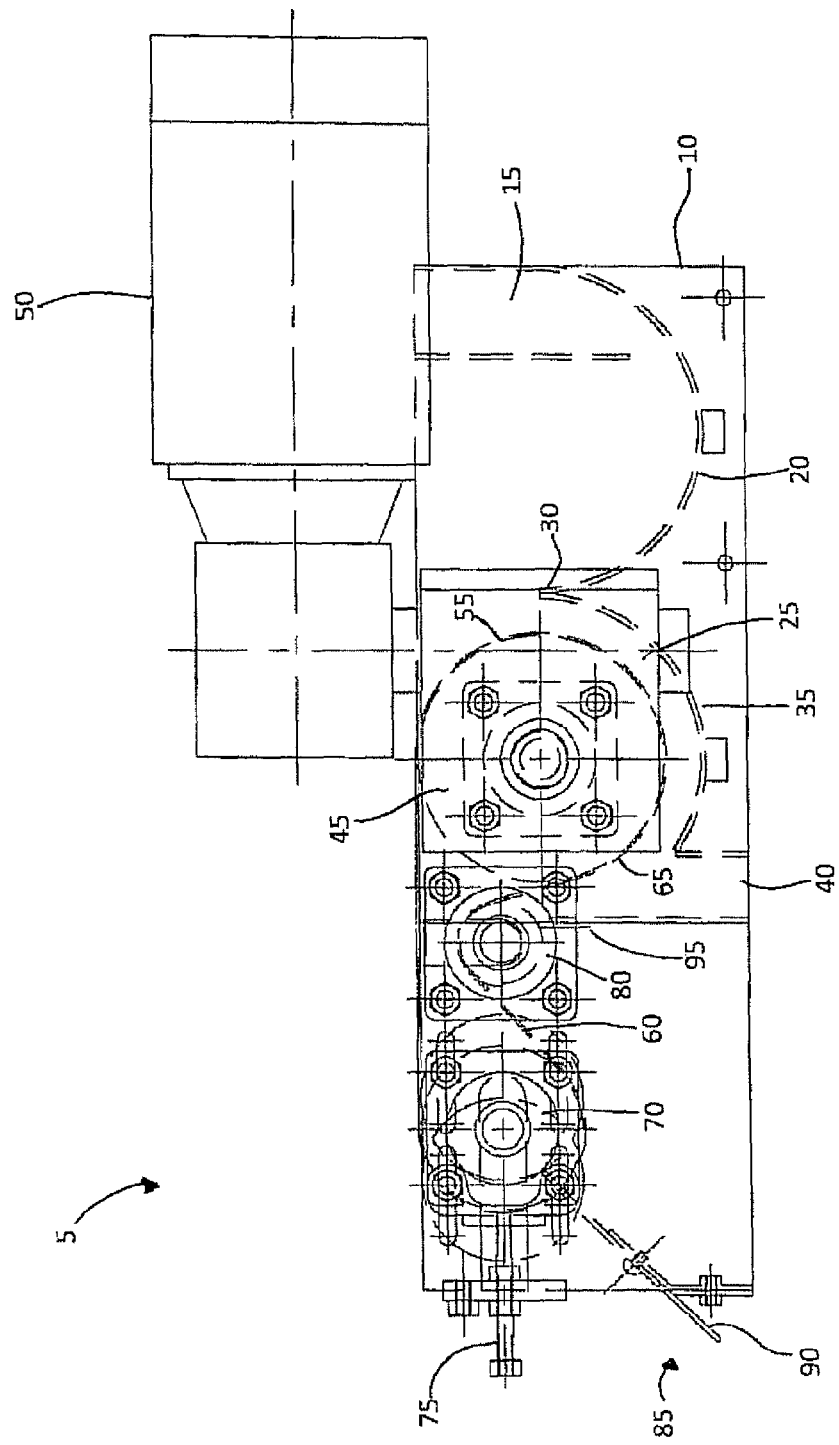
FIG. 1 is a side sectional view detailing the magnetic fluid cleaning system.
Figure 2:
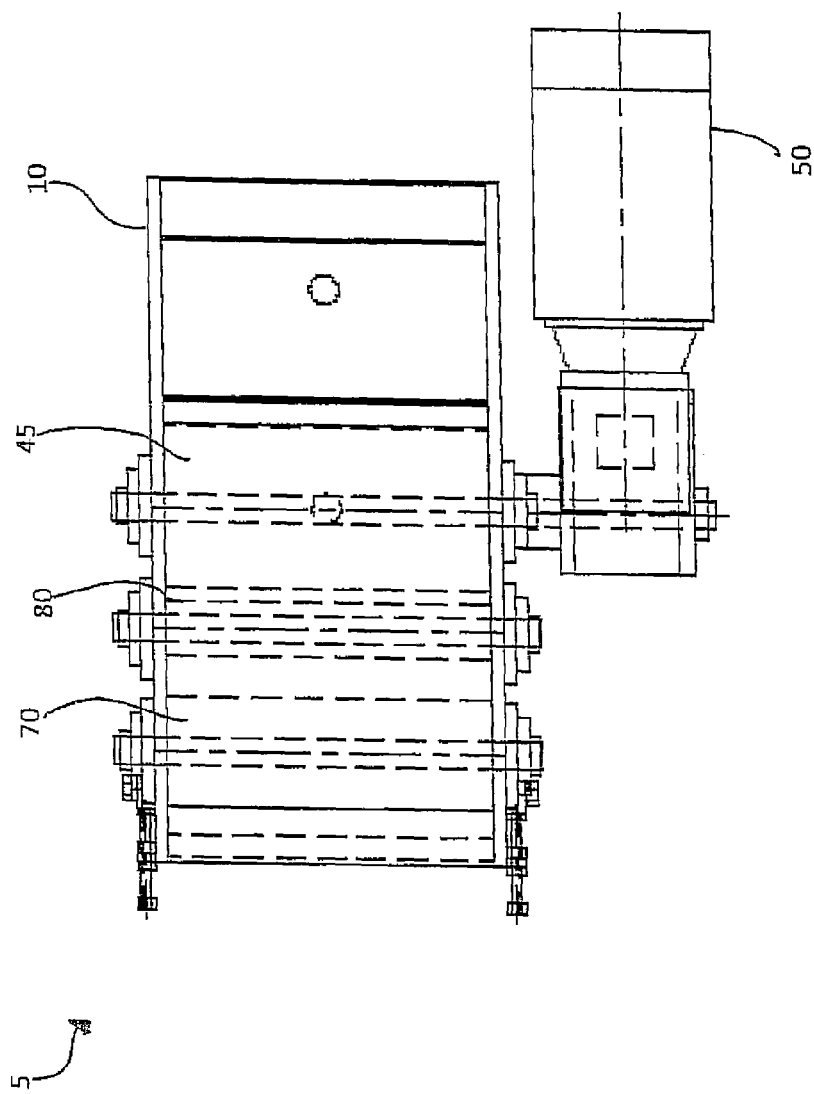
FIG. 2 is a top view detailing the magnetic fluid cleaning system.
Figure 3:
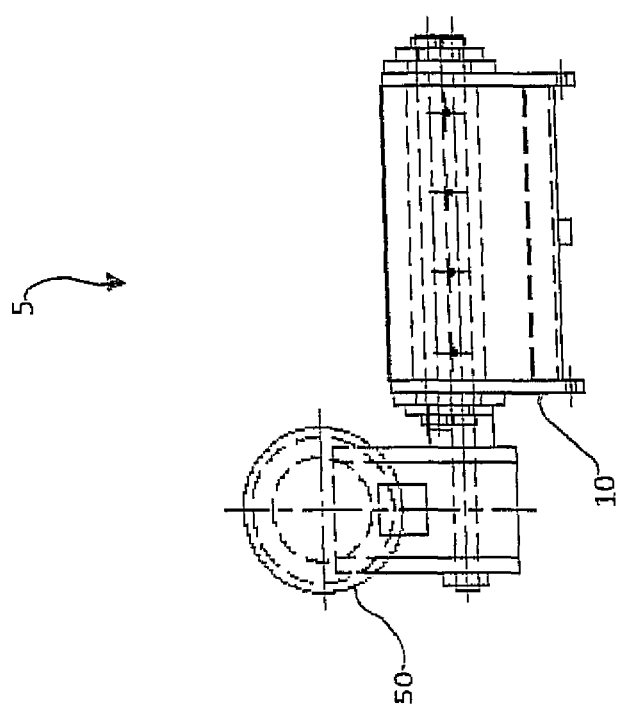
FIG. 3 is an end view of the magnetic fluid cleaning system.

Referring to FIG. 1, there is shown an embodiment of a magnetic fluid cleaning system 5. The magnetic fluid cleaning system 5 includes a housing 10. The housing 10 may include various sections and be in the form of a tank with an open top that receives the fluid to be cleaned. In the depicted embodiment, the housing 10 includes a fluid entry section 15 into which contaminated fluid is provided. The fluid entry 15 joins with a fluid accumulation trough 20 which regulates the amount of fluid delivered to a cleaning section 25. The fluid accumulation trough 20 and cleaning section 25 are separated by a fluid dam 30 joining the two sections. Within the cleaning section 25 is a radiused trough 35 that leads to a clean fluid exit 40.

A magnetic roller 45 is disposed within the housing 10 within the cleaning section 25. The magnetic roller 45 may be driven by a motor 50 which may include a reduction transmission. In one aspect, the motor 50 may be electrically driven, although other types of motors may be utilized.

In one aspect, the driven magnetic roller 45 is journaled or rotatably retained within the cleaning section 25 utilizing appropriate bearings or other types of structures. The magnetic roller 45 is coupled to the motor 50 to be driven rotatably within the housing. In one aspect, the magnetic roller 45 may include rare earth magnets positioned within and in a pattern to move fine suspended magnetic particles from the fluid. In one aspect, the magnetic roller 45 may include a nonmagnetic shell 55 that is sealed for submersion within the fluid such that it does not leak.

A belt 60 is arranged about the magnetic roller 45 for travel with the magnetic roller 45 as it is rotated. The belt 60 may include a gripping surface or structure formed on the inside surface of the belt 60 that is proximate the magnetic roller 45. In one aspect, the belt 60 receives the magnetic particles on an outer surface 65 from the fluid when the belt 60 travels with the magnetic roller 45 within a magnetic field of the magnetic roller 45. As the belt 60 travels through its path, the belt 60 travels out of the magnetic field and the magnetic particles remain on the belt 60 for subsequent removal. In one aspect, the belt 60 may be installed around the outside of the magnetic roller 45 and passes over a nonmagnetic roller 70 that is coupled to the housing 10 and separated from the magnetic roller 45. The nonmagnetic roller 70 and magnetic roller 45 define a belt path. In one aspect, the nonmagnetic roller 70 may include at least one tensioning device 75 that controls a position of the nonmagnetic roller 70 and adjusts a tension in the belt 60. The tensioning device 75 may include various types of structures including a device that is attached to the bearings that support the shaft of the nonmagnetic roller 70 such that the shafts may be moved along a defined path. In one aspect, two belt tensioning devices 75 may be positioned on opposing sides of the shaft to adjust a position and tension within the belt 60.

A return roller 80 may be positioned between the magnetic roller 45 and the nonmagnetic roller 70 to control a path of the belt 60. As can be seen in the figures, the return roller 80 is positioned between the magnetic and nonmagnetic rollers 45, 70 to move the path of the belt 60 upward and over the housing 10 wall behind the magnetic roller 45 that separates the cleaned fluid discharge and contaminated fluid.

In one aspect, at least one cleaning structure 85 is positioned relative to the belt 60 to remove the magnetic particles from the belt 60. In one aspect, a primary wiper 90 may be positioned proximate the nonmagnetic roller 70 to remove magnetic particles from the cleaning belt 60. In one aspect, the primary wiper 90 may be located approximately 45 degrees below the left quadrant of the nonmagnetic roller 70 as shown in the figures. In one aspect, the primary wiper 90 may be attached to the housing 10 such that it may be adjusted to control and adjust the pressure of the primary wiper 90 against the belt 60. Additionally, a secondary wiper 95 may be utilized to remove ferrous material from the belt 60 that is not removed by the primary wiper 90. In one aspect, the secondary wiper 95 may be positioned proximate the return roller 80 before the belt 60 returns to the cleaning section 25 of the housing 10.

In use, a contaminated fluid enters the system through the fluid entry point 15. The contaminated fluid fills the fluid accumulation trough 20 until the height of the fluid is sufficient to cascade the fluid over the fluid dam 30 and into the cleaning section 25. As the contaminated fluid passes over the dam 30 the fluid passes under the magnetic roller 45 along the radiused trough 35 of the cleaning section 25. In one aspect, the distance between the magnetic roller 45 and the radius 35 is controlled such that a magnetic field is exerted on the fluid and removes magnetic particles from the fluid.

The magnetic roller 45 is continuously rotating in a counterclockwise direction as shown in the figure at a predetermined rate. In one aspect, the magnetic roller 45 may rotate at five revolutions per minute. The belt 60 is installed around the outside of the magnetic roller 45 and passes over the nonmagnetic roller 70 and around the return roller 80. The return roller 80 raises the height of the belt 60 to pass over the housing 10 edge that separates the clean fluid from the contaminants. In one aspect, the belt 60 may be formed of a nonmagnetic material and is manufactured such that it does not include a splice that may cause excessive wear on the primary and secondary wipers 90, 95. As previously described above, the cleaning belt 60 may be tensioned by a belt tensioning device 75 to adjust a position and tracking of the belt 60 from uneven tension on opposing sides of the belt. As the contaminated fluid passes under the magnetic roller 45, the magnetic particles are held to the belt 60 by the magnets and the clean fluid is discharged to the exit 35 to be returned to a process that utilizes the fluid. The magnetic particles are attracted to the magnetic roller 45 and the magnetic force holds the contaminants to the outside of the belt 60. As the magnetic roller 45 rotates, the belt 60 also moves in a counterclockwise direction as shown in FIG. 1. As the belt 60 with the magnetic particles reaches the top of the magnetic roller 45, the path of the belt created by the position of the nonmagnetic roller 70 and the return roller 80 causes the belt 60 to leave the outside of the magnetic roller 45 removing the magnetic particles from the magnetic field of the magnetic roller 45. As the belt 60 travels away from the magnetic roller 45 and toward the nonmagnetic roller 70, the magnetic particles remain in position on the belt 60 due to gravity and a surface tension of the fluid on the belt 60.

As the belt 60 travels toward the nonmagnetic roller 70 the belt 60 continues over the nonmagnetic roller 70 toward the primary wiper 90. In this position, the magnetic particles may fall off the belt 60 as it travels around the nonmagnetic roller 70 with residual magnetic particles removed by the primary wiper 90. The belt 60 then continues to travel past the primary wiper 90 toward the cleaning section 25 wherein a secondary wiper 90 positioned proximate the return roller 80 may remove any further magnetic particles not removed by the primary wiper 90 and removes fluid held to the belt by surface tension. After passing through the secondary wiper 95 the belt 60 returns to the cleaning section 25 for travel about the magnetic roller 45 for removal of additional magnetic particles. In one aspect, the continuous movement of the belt 60 about the roller system provides an automated process in which magnetic particles are removed from the fluid continuously wherein the primary and secondary wipers 90, 95 remove the magnetic particles from the belt 60 avoiding excessive wear and clogging associated with prior art systems.

The invention claimed is:

1. A magnetic fluid cleaning system comprising:
   a housing;
   a driven magnetic roller disposed within the housing;
   a nonmagnetic roller coupled to the housing and separated from the magnetic roller;
   a belt arranged about the magnetic roller and the nonmagnetic roller defining a belt path, the belt having magnetic particles from the fluid received thereon when within a magnetic field of the magnetic roller;
   wherein the belt travels about the magnetic roller out of the magnetic field and the magnetic particles remain on the belt for removal and a return roller positioned between the magnetic roller and the nonmagnetic roller wherein the return roller raises the belt off of the magnetic roller removing the magnetic particles from the magnetic field of the magnetic roller.

2. The magnetic fluid cleaning system of claim 1 including at least one tensioning device controlling a position of the nonmagnetic roller and a tension in the belt.

3. The magnetic fluid cleaning system of claim 1 including at least one cleaning structure positioned relative to the belt removing the magnetic particles from the belt.

4. The magnetic fluid cleaning system of claim 3 wherein the at least one cleaning structure includes a primary wiper removing magnetic particles from the cleaning belt.

5. The magnetic fluid cleaning system of claim 4 wherein the primary wiper is adjustable changing a pressure on the cleaning belt for removal of magnetic particles.

6. The magnetic fluid cleaning system of claim 3 wherein the at least one cleaning structure includes a secondary wiper removing magnetic particles from the cleaning belt.

7. The magnetic fluid cleaning system of claim 1 wherein the magnetic roller includes rare earth magnets positioned therein.

8. The magnetic fluid cleaning system of claim 1 wherein the magnetic roller is driven by a motor including a gear reduction structure.

9. The magnetic fluid cleaning system of claim 1 wherein the magnetic roller rotates at approximately five revolutions per minute.

10. The magnetic fluid cleaning system of claim 1 wherein the belt includes a gripping structure positioned on an inside surface of the belt for contacting the driven magnetic roller.

11. The magnetic fluid cleaning system of claim 1 wherein the belt is formed of nonmagnetic material.

12. A magnetic fluid cleaning system comprising:
    a housing;
    a driven magnetic roller disposed within the housing;
    a nonmagnetic roller coupled to the housing and separated from the magnetic roller;
    a belt arranged about the magnetic roller and nonmagnetic roller, the belt having magnetic particles from the fluid received thereon when within a magnetic field of the magnetic roller;

a return roller positioned between the magnetic roller and the nonmagnetic roller controlling a path of the belt and raising the height of the belt over an edge of the housing that separates clean fluid from the contaminated fluid;

wherein the belt travels about the magnetic roller out of the magnetic field and the magnetic particles remain on the belt for removal.

\* \* \* \* \*